United States Patent
Hagimoto et al.

(10) Patent No.: US 8,171,723 B2
(45) Date of Patent: May 8, 2012

(54) ABNORMALITY DETECTION SYSTEM AND ABNORMALITY DETECTION METHOD FOR INTERNAL COMBUSTION ENGINE

(75) Inventors: Taiga Hagimoto, Susono (JP); Hiroshi Sawada, Gotenba (JP); Daisuke Shibata, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 287 days.

(21) Appl. No.: 12/674,445

(22) PCT Filed: Dec. 4, 2008

(86) PCT No.: PCT/IB2008/003681
§ 371 (c)(1),
(2), (4) Date: Feb. 22, 2010

(87) PCT Pub. No.: WO2009/071994
PCT Pub. Date: Jun. 11, 2009

(65) Prior Publication Data
US 2011/0146235 A1  Jun. 23, 2011

(30) Foreign Application Priority Data
Dec. 6, 2007  (JP) ................. 2007-315899

(51) Int. Cl.
*F01N 11/00* (2006.01)
*F01N 3/20* (2006.01)

(52) U.S. Cl. .......................... 60/286; 60/277

(58) Field of Classification Search ............ 60/277, 60/286
See application file for complete search history.

(56) References Cited

U.S. PATENT DOCUMENTS

| 5,628,186 A | 5/1997 | Schmelz |
| 2005/0287034 A1 | 12/2005 | Wills et al. |
| 2008/0034732 A1 | 2/2008 | Hosoya et al. |

FOREIGN PATENT DOCUMENTS

| EP | 1 767 754 | 3/2007 |
| JP | 7 54641 | 2/1995 |
| JP | 11 117726 | 4/1999 |
| JP | 2004 176719 | 6/2004 |
| JP | 2006 125323 | 5/2006 |
| JP | 2006 132442 | 5/2006 |
| JP | 2006 242094 | 9/2006 |
| JP | 2006 283757 | 10/2006 |

*Primary Examiner* — Kenneth Bomberg
*Assistant Examiner* — Abdul Elnoubi
(74) *Attorney, Agent, or Firm* — Oblon, Spivak, McClelland, Maier & Neustadt, L.L.P.

(57) ABSTRACT

When the NOx SCR catalyst (15) deteriorates, the NOx removal efficiency increases with an increase in the catalyst temperature as indicated by the curves B1 and B2. When there is an irregularity in the amount or quality of aqueous urea solution that is supplied to the NOx SCR catalyst, the NOx removal efficiency decreases at a constant rate as indicated by the curve C. When the NOx removal efficiency is first within the region X2 and then brought into the region Y1, it is determined that the NOx SCR catalyst deteriorates. When the NOx removal efficiency is first within the region X2 and then brought into the region Y2, it is determined that there is an irregularity in the amount or quality of the aqueous urea solution that is supplied to the NOx SCR catalyst.

11 Claims, 5 Drawing Sheets

ABNORMALITY DETECTION SYSTEM AND ABNORMALITY DETECTION METHOD FOR INTERNAL COMBUSTION ENGINE

BACKGROUND OF THE INVENTION

1. Field of the Invention

The invention relates to an abnormality detection system and abnormality detection method for an internal combustion engine.

2. Description of the Related Art

For example, Japanese Patent Application Publication No. 2004-176719 (JP-A-2004-176719) describes an internal combustion engine in which a NOx selective catalytic reduction catalyst (hereinafter, referred to as "NOx SCR catalyst") is arranged in an engine exhaust passage, and NOx contained in the exhaust gas is selectively reduced by ammonia that is generated from an aqueous urea solution that is supplied to the NOx SCR catalyst. According to JP-A-2004-176719, a sensor that detects, for example, ammonia generated from the aqueous urea solution is provided in the engine exhaust passage at a position downstream of the NOx SCR catalyst, and it is determined that an abnormality has occurred if a signal output from the sensor changes in an unexpected manner when the amount of aqueous urea solution that is supplied to the NOx SCR catalyst changes.

However, the signal output from the sensor changes in an unexpected manner in either the case where the amount or quality of aqueous urea solution that is supplied to the NOx SCR catalyst deviates from a regular value or the case where the NOx SCR catalyst deteriorates. Therefore, according to the above-described method, it is not possible to determine whether such an unexpected change has occurred due to an irregularity in the amount or quality of aqueous urea solution that is supplied to the NOx SCR catalyst or due to deterioration of the NOx SCR catalyst.

SUMMARY OF THE INVENTION

The invention provides an abnormality detection system and abnormality detection method for an internal combustion engine, which makes it possible to determine whether the NOx discharge amount exceeds a prescribed regulation value due to deterioration of a NOx selective catalytic reduction catalyst arranged in an engine exhaust passage of the internal combustion engine or due to an irregularity in the amount or quality of aqueous urea solution that is supplied to the NOx selective catalytic reduction catalyst.

A first aspect of the invention relates to an abnormality detection system for an internal combustion engine that determines whether the NOx discharge amount exceeds a prescribed regulation value due to deterioration of a NOx selective catalytic reduction catalyst arranged in an exhaust passage of the internal combustion engine or due to an irregularity in the amount or quality of aqueous urea solution that is supplied to the NOx selective catalytic reduction catalyst. The abnormality detection system includes: a determination-required region setting unit that sets a determination-required region to a region within which a NOx removal efficiency falls in either a case where the NOx discharge amount exceeds the regulation value due to deterioration of the NOx selective catalytic reduction catalyst or a case where the NOx discharge amount exceeds the regulation value due to an irregularity in the amount or quality of aqueous urea solution that is supplied to the NOx selective catalytic reduction catalyst, and in which the temperature of the NOx selective catalytic reduction catalyst is within a predetermined first temperature range; a first abnormality region setting unit that sets a first abnormality region to a region within which the NOx removal efficiency falls when the NOx discharge amount exceeds the regulation value due to deterioration of the NOx selective catalytic reduction catalyst, within which the NOx removal efficiency does not fall when the NOx discharge amount exceeds the regulation value due to an irregularity in the amount or quality of aqueous urea solution that is supplied to the NOx selective catalytic reduction catalyst, and in which the temperature of the NOx selective catalytic reduction catalyst is within a predetermined second temperature range having the lower limit that is higher than the upper limit of the first temperature range; a second abnormality region setting unit that sets a second abnormality region to a region within which the NOx removal efficiency falls when the NOx discharge amount exceeds the regulation value due to an irregularity in the amount or quality of aqueous urea solution that is supplied to the NOx selective catalytic reduction catalyst, within which the NOx removal efficiency does not fall when the NOx discharge amount exceeds the prescribed regulation value due to deterioration of the NOx selective catalytic reduction catalyst, and in which the temperature of the NOx selective catalytic reduction catalyst is within the second temperature range; and an abnormality factor determination unit that determines that the NOx discharge amount exceeds the regulation value due to deterioration of the NOx selective catalytic reduction catalyst, if it is determined that the NOx removal efficiency is within the determination-required region when the temperature of the NOx selective catalytic reduction catalyst is within the first temperature range and it is then determined that the NOx removal efficiency falls within the first abnormality region when the temperature of the NOx selective catalytic reduction catalyst is brought into the second temperature range; and the abnormality factor determination unit determining that the NOx discharge amount exceeds the regulation value due to an irregularity in the amount or quality of aqueous urea solution that is supplied to the NOx selective catalytic reduction catalyst, if it is determined that the NOx removal efficiency is within the determination-required region when the temperature of the NOx selective catalytic reduction catalyst is within the first temperature range and it is then determined that the NOx removal efficiency falls within the second abnormality region when the temperature of the NOx selective catalytic reduction catalyst is brought into the second temperature range.

A second aspect of the invention relates to an abnormality detection method for an internal combustion engine, according to which it is determined whether the NOx discharge amount exceeds a prescribed regulation value due to deterioration of a NOx selective catalytic reduction catalyst arranged in an exhaust passage of the internal combustion engine or due to an irregularity in the amount or quality of aqueous urea solution that is supplied to the NOx selective catalytic reduction catalyst. According to the abnormality detection method, a determination-required region is set to a region within which a NOx removal efficiency falls in either a case where the NOx discharge amount exceeds the regulation value due to deterioration of the NOx selective catalytic reduction catalyst or a case where the NOx discharge amount exceeds the regulation value due to an irregularity in the amount or quality of aqueous urea solution that is supplied to the NOx selective catalytic reduction catalyst, and in which the temperature of the NOx selective catalytic reduction catalyst is within a predetermined first temperature range; a first abnormality region is set to a region within which the NOx removal efficiency falls when the NOx discharge amount exceeds the regulation value due to deterioration of the NOx selective catalytic reduction catalyst, within which the NOx removal efficiency does not fall when the NOx discharge amount exceeds the regulation value due to an irregularity in the amount or quality of aqueous urea solution that is supplied to the NOx selective catalytic reduction catalyst, and in which the temperature of the NOx selective catalytic reduction catalyst is within a predetermined second temperature range having the lower limit that is higher than the upper limit of the first temperature range; and a second abnormality region is set to a region within which the NOx removal efficiency falls when the NOx discharge amount exceeds the regulation value due to an irregularity in the amount or quality of aqueous urea solution that is supplied to the NOx selective catalytic reduction catalyst, within which the NOx removal efficiency does not fall when the NOx discharge amount exceeds the prescribed regulation value due to deterioration of the NOx selective catalytic reduction catalyst, and in which the temperature of the NOx selective catalytic reduction catalyst is within the second temperature range. It is determined that the NOx discharge amount exceeds the regulation value due to deterioration of the NOx selective catalytic reduction catalyst, if it is determined that the NOx removal efficiency is within the determination-required region when the temperature of the NOx selective catalytic reduction catalyst is within the first temperature range and it is then determined that the NOx removal efficiency falls within the first abnormality region when the temperature of the NOx selective catalytic reduction catalyst is brought into the second temperature range. It is determined that the NOx discharge amount exceeds the regulation value due to an irregularity in the amount or quality of aqueous urea solution that is supplied to the NOx selective catalytic reduction catalyst, if it is determined that the NOx removal efficiency is within the determination-required region when the temperature of the NOx selective catalytic reduction catalyst is within the first temperature range and it is then determined that the NOx removal efficiency falls within the second abnormality region when the temperature of the NOx selective catalytic reduction catalyst is brought into the second temperature range.

According to the embodiments of the invention described above, it is possible to reliably determine whether the NOx discharge amount exceeds the prescribed regulation value due to deterioration of the NOx selective catalytic reduction catalyst or due to an irregularity in the amount or quality of aqueous urea solution that is supplied to the NOx selective catalytic reduction catalyst.

BRIEF DESCRIPTION OF THE DRAWINGS

The foregoing and further features and advantages of the invention will become apparent from the following description of an example embodiment with reference to the accompanying drawings, wherein the same or corresponding portions will be denoted by the same reference numerals and wherein.

DETAILED DESCRIPTION OF THE EMBODIMENT

Figure 1:
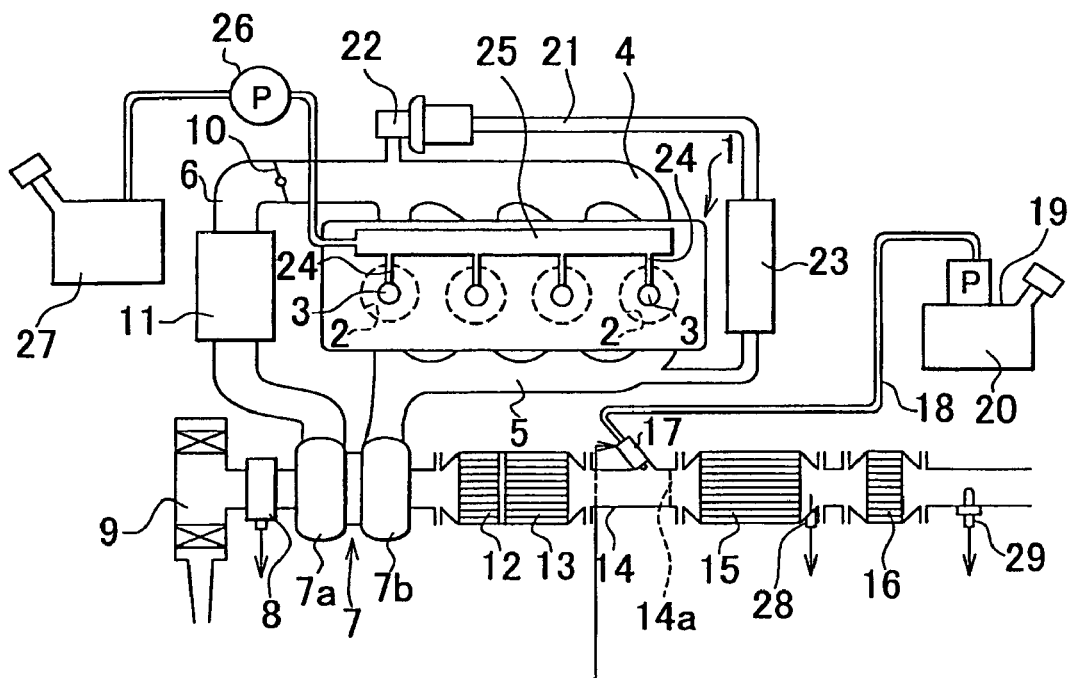
FIG. 1 is an overall view of a compression ignition internal combustion engine.
Figure 1:
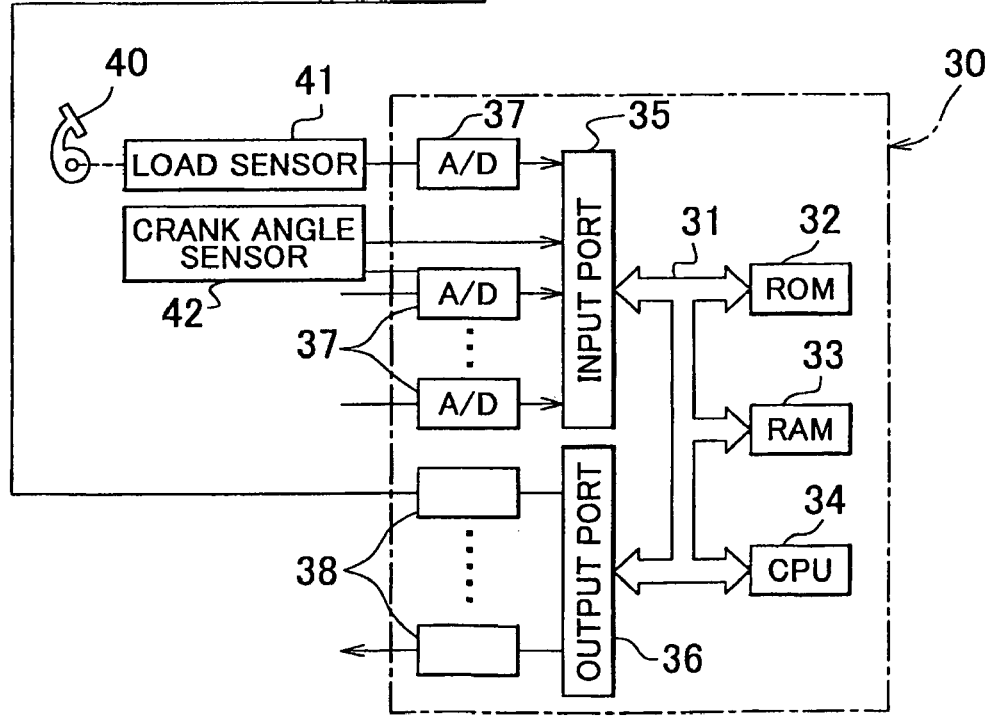

FIG. 1 is an overall view showing a compression ignition internal combustion engine. As shown in FIG. 1, the compression ignition internal combustion engine includes an engine body 1, combustion chambers 2 of cylinders, and electronically-controlled fuel injection valves that inject fuel into the combustion chambers 2, an intake manifold 4, and an exhaust manifold 5. The intake manifold 4 is connected to an outlet of a compressor 7a of an exhaust turbocharger 7 via an intake duct 6, and an inlet of the compressor 7a is connected to an air cleaner 9 via an intake air amount detector 8. A throttle valve 10 that is driven by a step motor is provided in the intake duct 6, and a cooling unit 11 that cools the intake air flowing through the intake duct 6 is provided around the intake duct 6. In an embodiment of the invention shown in FIG. 1, an engine coolant is introduced into the cooling unit 11, and the intake air is cooled by the engine coolant.

The exhaust manifold 5 is connected to an inlet of an exhaust turbine 7b of the exhaust turbocharger 7, and an outlet of the exhaust turbine 7b is connected to an inlet of an oxidation catalyst 12. A particulate filter 13 that traps particulate matter contained in the exhaust gas is arranged at a position downstream of and next to the oxidation catalyst 12. An outlet of the particulate filter 13 is connected to an inlet of a NOx SCR catalyst 15 via an exhaust pipe 14. An oxidation catalyst 16 is connected to an outlet of the NOx SCR catalyst 15.

An aqueous urea solution supply valve 17 is arranged in the exhaust pipe 14 at a position upstream of the NOx SCR catalyst 15, and the aqueous urea solution supply valve 17 is connected to an aqueous urea solution tank 20 via a supply pipe 18 and a supply pump 19. The aqueous urea solution stored in the aqueous urea solution tank 20 is injected by the supply pump 19 from the aqueous urea solution supply valve 17 toward a dispersion plate 14a that is provided in the exhaust pipe 14. NOx that is contained in the exhaust gas is reduced in the NOx SCR catalyst 15 by the ammonia $((NH_2)_2CO+H_2O \rightarrow 2NH_3+CO_2)$ generated from urea.

The exhaust manifold 5 and the intake manifold 4 are connected to each other via an exhaust gas recirculation (hereinafter, referred to as "EGR") passage 21, and an electronically-controlled EGR control valve 22 is arranged in the EGR passage 21. Also, a cooling unit 23 that cools the EGR gas flowing through the EGR passage 21 is provided around the EGR passage 21. In the embodiment of the invention shown in FIG. 1, the engine coolant is introduced into the cooling unit 23, and the EGR gas is cooled by the engine coolant. The fuel injection valves 3 are connected to a common rail 25 via fuel supply pipes 24, and the common rail 25 is connected to a fuel tank 27 via an electronically-controlled variable delivery fuel pump 26. The fuel stored in the fuel tank 27 is supplied into the common rail 25 by the fuel pump 26, and the fuel supplied into the common rail 25 is supplied to the fuel injection valves 3 through the respective fuel supply pipes 24.

An electronic control unit 30 is formed of a digital computer, and includes a ROM (Read Only Memory) 32, a RAM (Random Access Memory) 33, a CPU (microprocessor) 34, an input port 35 and an output port 36 that are connected to each other by a bi-directional bus 31. A temperature sensor 28 that detects the temperature of the NOx SCR catalyst 15 is provided at a position downstream of the NOx SCR catalyst 15, and a NOx sensor 29 that detects the NOx concentration in the exhaust gas is provided at a position downstream of the oxidation catalyst 16. Signals output from the temperature sensor 28, the NOx sensor 29 and the intake air amount detector 8 are transmitted to the input port 35 via corresponding A/D converters 37.

A load sensor 41 that generates an output voltage proportional to a depression amount L of an accelerator pedal 40 is connected to the accelerator pedal 40, and the output voltage from the load sensor 41 is input in the input port 35 via the A/D converter 37 that is connected to the load sensor 41. A crank angle sensor 42 that generates an output pulse each time a crankshaft rotates, for example, 15 degrees is connected to the input port 35. The output port 36 is connected to the fuel injection valves 3, the step motor that drives the throttle valve 10, the aqueous urea solution supply valve 17, the supply pump 19, the EGR control valve 22 and the fuel pump 26 via respective drive circuits 38.

The oxidation catalyst 12 supports a precious metal catalyst, for example, platinum, and the oxidation catalyst 12 has the function of converting NO contained in the exhaust gas into $NO_2$ and the function of oxidizing HC contained in the exhaust gas. $NO_2$ has an oxidizing property that is higher than that of NO. Therefore, if NO is converted into $NO_2$, the oxidation reaction of the particulate matter that is trapped on the particulate filter 13 is promoted, and the reduction action by ammonia is promoted in the NOx SCR catalyst 15. If HC is adsorbed onto the NOx SCR catalyst 15, the NOx removal efficiency decreases because the amount of ammonia adsorbed on the NOx SCR catalyst 15 decreases. Accordingly, it is possible to suppress decreases in the NOx removal efficiency by oxidizing HC using the oxidation catalyst 12.

As the particulate filter 13, either a particulate filter that does not support a catalyst or a particulate filter that supports a precious metal catalyst, for example, platinum, may be used. The NOx SCR catalyst 15 is formed of ammonia adsorption Fe zeolite that exhibits a high NOx removal efficiency at a low temperature. The oxidation catalyst 16 supports a precious metal catalyst formed of, for example, platinum. The oxidation catalyst 16 oxidizes the ammonia that leaks from the NOx SCR catalyst 15.

Figure 2A:
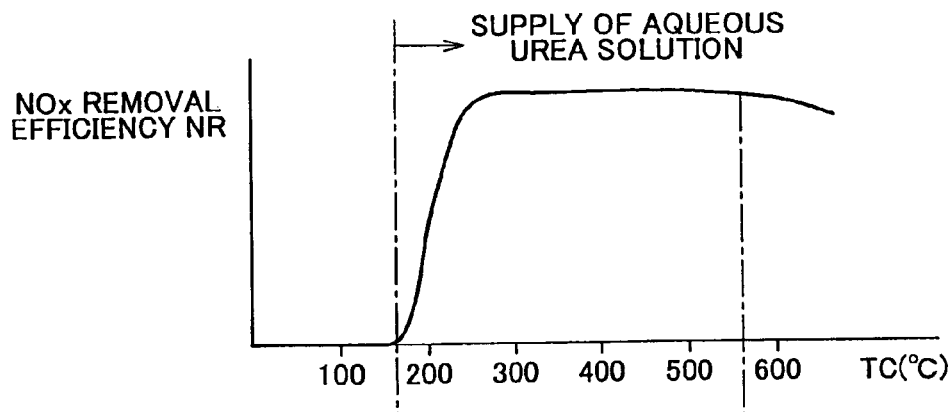
FIG. 2 is a graph showing the relationship between a NOx removal efficiency NR and a catalyst temperature TC, etc.

In the embodiment of the invention shown in FIG. 1, the NOx SCR catalyst 15 is activated at a temperature of approximately 200° C. After the NOx SCR catalyst 15 is activated, the aqueous urea solution is supplied, in an amount required to reduce NOx contained in the exhaust gas, from the aqueous urea solution supply valve 17. FIG. 2A shows the relationship between the NOx removal efficiency NR and the temperature TC of the NOx SCR catalyst 15 when the NOx SCR catalyst 15 has not deteriorated, the supply amount of the aqueous urea solution is maintained at the regular value that is required to reduce NOx in the exhaust gas, and the quality of aqueous urea solution is maintained at the regular quality.

As shown in FIG. 2A, when the temperature TC of the NOx SCR catalyst 15 increases to the activation temperature, the NOx removal efficiency rapidly increases to a peak value. When the temperature TC of the NOx SCR catalyst 15 further increases, the NOx removal efficiency NR is maintained at the peak value. When the catalyst temperature TC is relatively low, the aqueous urea solution supplied from the aqueous urea solution supply valve 17 is once adsorbed onto the NOx SCR catalyst 15 in the form of ammonia, and NOx in the exhaust gas reacts with the ammonia adsorbed on the NOx SCR catalyst 15 to be reduced.

Figure 2B:
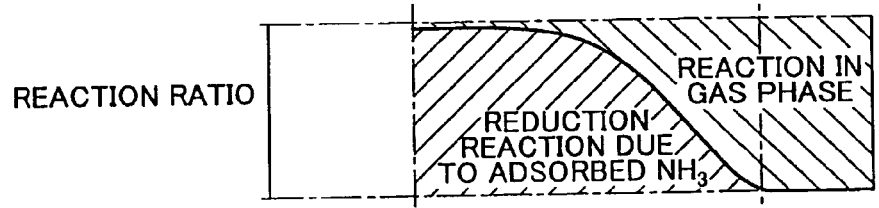

On the other hand, when the catalyst temperature TC increases, ammonia is no longer adsorbed onto the NOx SCR catalyst 15. At this time, NOx in the exhaust gas reacts with the ammonia generated from the aqueous urea solution in the gas phase to be reduced. FIG. 2B schematically shows this phenomenon. That is, as shown in FIG. 2B, as the catalyst temperature TC increases, the ratio of the amount of NOx that is reduced due to reaction with the ammonia adsorbed on the NOx SCR catalyst 15 to the entire amount of NOx that is reduced due to reaction with ammonia decreases while the ratio of the amount of NOx that is reduced due to reaction with the ammonia in the gas phase to the entire amount of NOx that is reduced due to reaction with ammonia increases.

The NOx discharge standard varies with each country or region. In this case, the total amount of NOx that is discharged when a vehicle is driven in a prescribed mode is usually used as the standard for the NOx discharge amount. The NOx discharge standard is set in such a manner that the standard is met if the NOx discharge amount after the vehicle is used for a predetermined duration of time is equal to or smaller than a NOx discharge standard amount.

In addition to this discharge standard, a discharge regulation is set. According to the discharge regulation, the NOx discharge amount must not exceed a prescribed regulation value. Although the regulation value varies with each country or region, the regulation value is two or three times as large as the NOx discharge standard amount. In some countries, it is compulsory to illuminate an alarm lamp that indicates the location of abnormality if the NOx discharge amount exceeds the regulation value.

In the embodiment of the invention, deterioration of the NOx SCR catalyst 15 and an irregularity in the amount or quality of aqueous urea solution that is supplied to the NOx SCR catalyst 15 are regarded as the factors of an abnormal increase in the NOx discharge amount. According to the embodiment of the invention, it is determined whether the NOx discharge amount exceeds a prescribed regulation value due to deterioration of the NOx SCR catalyst 15 or due to an irregularity in the amount or quality of aqueous urea solution that is supplied to the NOx SCR catalyst 15.

Figure 2C:
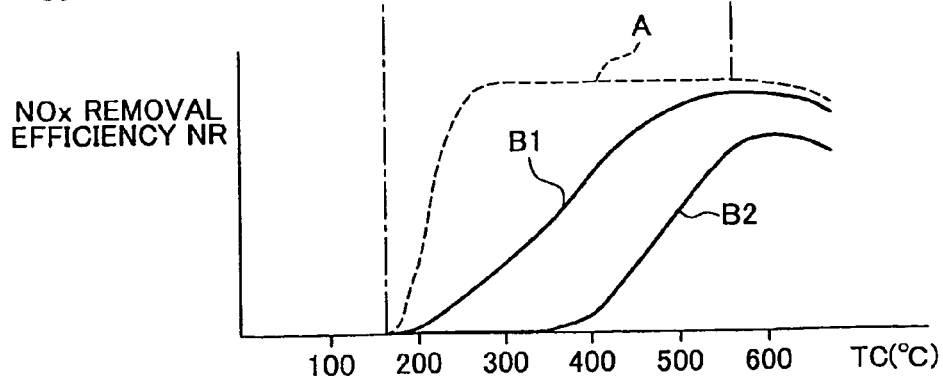
Figure 3A:
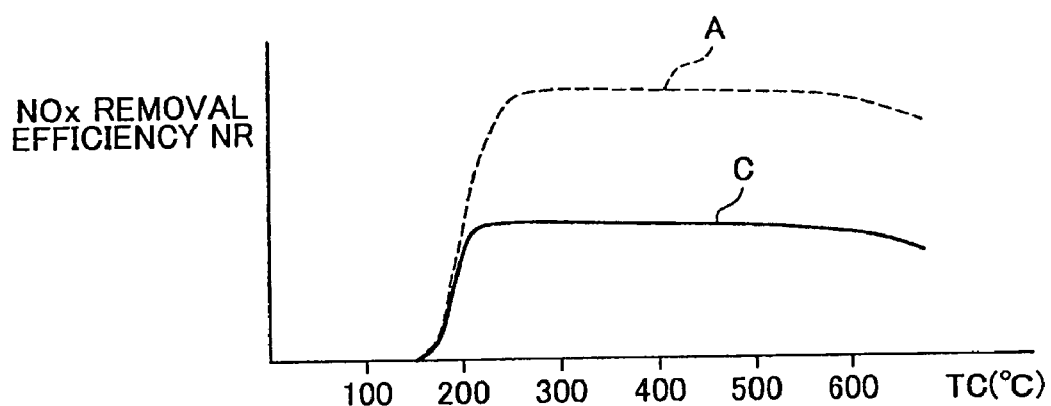
FIG. 3 is a graph showing the relationship between the NOx removal efficiency and the catalyst temperature TC.
Figure 3B:
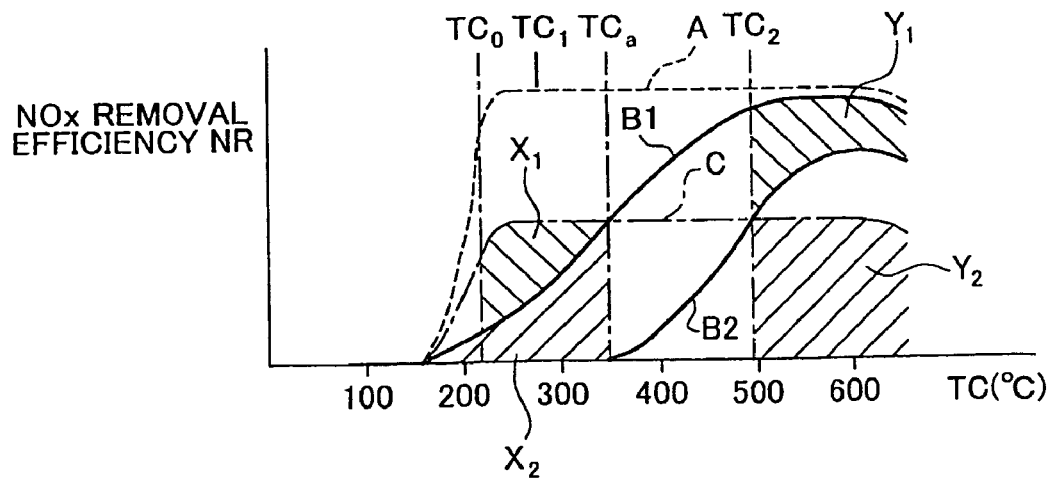

Next, the manner for performing the above-described determination will be described with reference to FIGS. 2C, 3A and 3B. FIGS. 2C, 3A and 3B show the case in which the regulation value is two times as large as the NOx discharge standard amount. In FIGS. 2C, 3A and 3B, a dashed line A indicates the NOx removal efficiency NR when the NOx discharge amount matches the NOx discharge standard amount. In other words, if the vehicle is driven in a prescribed mode in the state where the NOx removal efficiency NR changes with respect to the catalyst temperature TC in a manner indicated by the dashed line A shown in FIGS. 2C, 3A and 3B, the NOx discharge amount matches the NOx discharge standard amount. Hereinafter, the NOx removal efficiency NR indicated by the dashed line A will be referred to as "standard NOx removal efficiency A".

In FIG. 2C, a solid line B1 indicates the NOx removal efficiency NR when the NOx discharge amount reaches the regulation value, which is two times as large as the NOx discharge standard amount, due to deterioration of the NOx SCR catalyst 15, and a solid line B2 indicates the NOx removal efficiency NR when the catalysis of the NOx SCR catalyst 15 is completely lost. The fact that the NOx discharge amount reaches the value that is two times as large as the NOx discharge standard amount means that the NOx removal efficiency decreases to 50% of the standard NOx removal efficiency A. Therefore, the solid line B1 indicates the case in which the NOx removal efficiency NR is 50% of the standard NOx removal efficiency A.

The ammonia adsorption action of the NOx SCR catalyst 15 and the NOx reduction action of the ammonia adsorbed on the NOx SCR catalyst 15 are governed by the activity of the catalyst. Therefore, as shown in FIG. 2B, when the NOx reduction action of the adsorbed ammonia is dominant, that is, when the catalyst temperature TC is relatively low, if the NOx SCR catalyst 15 deteriorates, the NOx removal efficiency NR drastically decreases as indicated by the solid lines B1 and B2 in FIG. 2C.

In contrast, when the NOx reduction action is performed in the gas phase, the NOx reduction action is hardly governed by the activity of the catalyst. Therefore, as shown in FIG. 2B, when the NOx reduction action in the gas phase is dominant, that is, when the catalyst temperature TC is relatively high, even if the NOx SCR catalyst 15 deteriorates, the NOx removal efficiency NR does not decrease significantly as shown by the solid lines B1 and B2 in FIG. 2C.

That is, as indicated by the solid line B1, when the NOx removal efficiency is decreased to 50% of the standard NOx removal efficiency A due to deterioration of the NOx SCR catalyst 15, the NOx removal efficiency NR increases as the catalyst temperature TC increases. When the catalyst temperature TC is equal to or higher than 450° C., the NOx removal efficiency NR is close to the standard NOx removal efficiency A. As indicated by the solid line B2, even when the catalysis of the NOx SCR catalyst 15 is completely lost, the NOx removal efficiency NR increases as the catalyst temperature TC increases. When the catalyst temperature TC is equal to or higher than 500° C., The NOx removal efficiency NR is equal to or higher than 50% of the standard NOx removal efficiency A.

Next, the case in which the NOx removal efficiency NR decreases due to an irregularity in the amount or quality of aqueous urea solution that is supplied to the NOx SCR catalyst 15 will be described. The amount of aqueous urea solution that is supplied to the NOx SCR catalyst 15 is set in advance based on the engine operating state. However, if the supply amount of aqueous urea solution becomes less than the regular value due to, for example, clogging of a nozzle outlet of the aqueous urea solution supply valve 17, the NOx removal efficiency decreases. Also, if a substandard aqueous urea solution having a low ammonia concentration is used instead of the regular aqueous urea solution, or if another solution, for example, water is supplied into the aqueous urea solution tank 20, the NOx removal efficiency NR decreases.

A solid line C in FIG. 3A indicates the NOx removal efficiency NR when the NOx discharge amount reaches the regulation value that is two times as large as the NOx discharge standard amount due to an irregularity in the amount or quality of aqueous urea solution that is supplied to the NOx SCR catalyst 15. As described above, the fact that the NOx discharge amount is two times as large as the NOx discharge standard amount means that the NOx removal efficiency NR decreases to 50% of the standard NOx removal efficiency A. Therefore, the solid line C indicates the case in which the NOx removal efficiency NR is 50% of the standard NOx removal efficiency A.

If the nozzle outlet of the aqueous urea solution supply valve 17 clogs or the ammonia concentration in the aqueous urea solution decreases, the amount of ammonia that can be used to reduce NOx decreases at a constant rate independently of the supply amount of aqueous urea solution. Accordingly, as indicated by the solid line C in FIG. 3A, the NOx removal efficiency NR decreases with respect to the standard NOx removal efficiency A at a constant rate independently of the catalyst temperature TC.

A comparison between FIG. 2C and FIG. 3A shows that the pattern in which the NOx removal efficiency NR changes with respect to the catalyst temperature TC differs between when the NOx SCR catalyst 15 deteriorates and when an irregularity occurs in the amount or quality of aqueous urea solution that is supplied to the NOx SCR catalyst 15. Therefore, it is possible to determine whether the NOx SCR catalyst 15 deteriorates or an irregularity occurs in the amount or quality of aqueous urea solution that is supplied to the NOx SCR catalyst 15 using the difference in the pattern in which the NOx removal efficiency NR changes.

Therefore, according to the embodiment of the invention, it is determined, using the difference in the pattern in which the NOx removal efficiency changes, whether the NOx discharge amount exceeds the prescribed regulation value due to deterioration of the NOx SCR catalyst 15 or due to an irregularity in the amount or quality of aqueous urea solution that is supplied to the NOx SCR catalyst 15. This will be described with reference to FIG. 3B that is obtained by combining FIG. 2C with FIG. 3A.

FIG. 3B shows, as a typical example, the case in which it is determined whether the NOx removal efficiency NR is decreased to a value equal to or lower than 50% of the standard NOx removal efficiency A due to deterioration of the NOx SCR catalyst 15 or due to an irregularity in the amount or quality of aqueous urea solution that is supplied to the NOx SCR catalyst 15.

Such a determination is made according to FIG. 3B on the assumption that although slight deterioration of the NOx SCR catalyst 15 and a minor irregularity in the amount or quality of aqueous urea solution may occur at the same time, deterioration of the NOx SCR catalyst 15 that decreases the NOx removal efficiency to a value equal to or lower than 50% of the standard NOx removal efficiency A and an irregularity in the amount or quality of aqueous urea solution that decreases the NOx removal efficiency to a value equal to or lower than 50% of the standard NOx removal efficiency do not occur at the same time.

First, with reference to FIG. 3B, description will be provided concerning the case in which the catalyst temperature TC is equal to or higher than an activation temperature $TC_0$ and lower than a catalyst temperature TCa that is the catalyst temperature at the intersecting point of the curve B1 and the curve C. When the NOx removal efficiency is decreased to a value equal to or lower than 50% of the standard NOx removal efficiency A due to deterioration of the NOx SCR catalyst 15, the NOx removal efficiency NR at any given catalyst temperature TC is a value on or below the curve B1. When the NOx removal efficiency is decreased to a value equal to or lower than 50% of the standard NOx removal efficiency A due to an irregularity in the amount or quality of aqueous urea solution that is supplied to the NOx SCR catalyst 15, the NOx removal efficiency NR at any given catalyst temperature TC is on or below the curve C.

As described above, when the NOx removal efficiency is decreased to a value equal to or lower than 50% of the standard NOx removal efficiency A due to deterioration of the NOx SCR catalyst 15, the NOx removal efficiency NR at any given catalyst temperature TC is a value on or below the curve B1. Therefore, when the NOx removal efficiency NR is within a region that is above the curve B1 and below the curve C, that is, a hatched region $X_1$ shown in FIG. 3B, the NOx removal efficiency NR is decreased to a value equal to or lower than 50% of the standard NOx removal efficiency A due to an irregularity in the amount or quality of aqueous urea solution that is supplied to the NOx SCR catalyst 15.

When the NOx removal efficiency NR is within the region $X_1$, it is confirmed that the NOx removal efficiency NR is decreased to a value equal to or lower than 50% of the standard NOx removal efficiency A due to an irregularity in the amount or quality of aqueous urea solution that is supplied to the NOx SCR catalyst 15. Therefore, the region $X_1$ will be referred to as "irregularity confirmed region".

On the other hand, when the NOx removal efficiency NR is within a region below the curve B1, that is, a hatched region $X_2$ shown in FIG. 3B, it is not possible to determine whether the NOx removal efficiency NR is decreased to a value equal to or lower than 50% of the standard NOx removal efficiency A due to deterioration of the NOx SCR catalyst 15 or due to an irregularity in the amount or quality of aqueous urea solution that is supplied to the NOx SCR catalyst 15.

Therefore, in this case, it is necessary to determine whether the NOx removal efficiency NR is decreased to a value equal to or lower than 50% of the standard NOx removal efficiency A due to deterioration of the NOx SCR catalyst 15 or due to an irregularity in the amount or quality of aqueous urea solution that is supplied to the NOx SCR catalyst 15. Accordingly, the hatched region $X_2$ will be referred to as "determination-required region".

In an example shown in FIG. 3B, the determination is performed when the catalyst temperature TC becomes higher than a catalyst temperature $TC_2$ that is the catalyst temperature at the intersecting point of the curve B2 and the curve C. When the catalyst temperature TC is higher than the catalyst temperature $TC_2$, if the NOx removal efficiency is decreased to a value equal to or lower than 50% of the standard NOx removal efficiency A due to deterioration of the NOx SCR catalyst 15, the NOx removal efficiency NR at any given catalyst temperature TC is within a hatched region $Y_1$ between the curve B1 and the curve B2. If the NOx removal efficiency NR is decreased to a value equal to or lower than 50% of the standard NOx removal efficiency A due to an irregularity in the amount or quality of aqueous urea solution that is supplied to the NOx SCR catalyst 15, the NOx removal efficiency NR at any given catalyst temperature TC is within a hatched region $Y_2$ below the curve C.

When the NOx removal efficiency is decreased to a value equal to or lower than 50% of the standard NOx removal efficiency A due to deterioration of the NOx SCR catalyst 15, the NOx removal efficiency NR is within the hatched region $Y_1$ and is not brought to the region $Y_2$. Accordingly, if the NOx removal efficiency NR is within the region $Y_1$, it is determined that the NOx removal efficiency is decreased to a value equal to or lower than 50% of the standard NOx removal efficiency A due to deterioration of the NOx SCR catalyst 15. The region $Y_1$ will be referred to as "first abnormality region".

On the other hand, when the NOx removal efficiency is decreased to a value equal to or lower than 50% of the standard NOx removal efficiency A due to an irregularity in the amount or quality of aqueous urea solution that is supplied to the NOx SCR catalyst 15, the NOx removal efficiency NR is within the region $Y_2$ and is never within the region $Y_1$. Therefore, when the NOx removal efficiency NR is within the region $Y_2$, the NOx removal efficiency is decreased to a value equal to or lower than 50% of the standard NOx removal efficiency A due to an irregularity in the amount or quality of aqueous urea solution that is supplied to the NOx SCR catalyst 15. The region $Y_2$ will be referred to as "second abnormality region".

As described above, in the example shown in FIG. 3B, if the NOx removal efficiency NR is within the determination-required region $X_2$ when the catalyst temperature TC is low and is brought into the first abnormality region $Y_1$ when the catalyst temperature TC is increased, it is determined that the NOx removal efficiency is decreased to a value equal to or lower than 50% of the standard NOx removal efficiency A due to deterioration of the NOx SCR catalyst 15. On the other hand, if the NOx removal efficiency NR is within the determination-required region $X_2$ when the catalyst temperature TC is low and is brought into the second abnormality region $Y_2$ when the catalyst temperature TC is increased, it is determined that the NOx removal efficiency is decreased to a value equal to or lower than 50% of the standard NOx removal efficiency A due to an irregularity in the amount or quality of aqueous urea solution that is supplied to the NOx SCR catalyst 15.

While the invention has been described with reference to the example embodiment shown in FIG. 3B, generalized description on the invention will be provided below.

According to the invention, the determination-required region $X_2$ is set to a region, within which the NOx removal efficiency NR falls in, either the case where the NOx discharge amount exceeds the prescribed regulation value due to deterioration of the NOx SCR catalyst 15 or the case where the NOx discharge amount exceeds the regulation value due to an irregularity in the amount or quality of aqueous urea solution that is supplied to the NOx SCR catalyst 15, and in which the catalyst temperature TC of the NOx SCR catalyst 15 is within a predetermined first temperature range. The first abnormality region $Y_1$ is set to a region, within which the NOx removal efficiency NR falls when the NOx discharge amount exceeds the regulation value due to deterioration of the NOx SCR catalyst 15, within which the NOx removal efficiency NR does not fall when the NOx discharge amount exceeds the prescribed regulation value due to an irregularity in the amount or quality of aqueous urea solution that is supplied to the NOx SCR catalyst 15, and in which the catalyst temperature TC of the NOx SCR catalyst 15 is within a predetermined second temperature range having the lower limit that is higher than the upper limit of the first temperature range. The second abnormality region $Y_2$ is set to a region, within which the NOx removal efficiency NR falls when the NOx discharge amount exceeds the regulation value due to an irregularity in the amount or quality of aqueous urea solution that is supplied to the NOx SCR catalyst 15, within which the NOx removal efficiency NR does not fall when the NOx discharge amount exceeds the prescribed regulation value due to deterioration of the NOx SCR catalyst 15, and in which the catalyst temperature TC is within the predetermined second temperature range. If it is determined that the NOx removal efficiency NR is within the determination-required region $X_2$ when the temperature TC of the NOx SCR catalyst 15 is within the first temperature range and it is then determined that the NOx removal efficiency NR falls within the first abnormality region $Y_1$ when the temperature TC of the NOx SCR catalyst 15 is brought into the second temperature range, it is determined that the NOx discharge amount exceeds the regulation value due to deterioration of the NOx SCR catalyst 15. On the other hand, if it is determined that the NOx removal efficiency NR is within the determination-required region $X_2$ when the temperature TC of the NOx SCR catalyst 15 is within the first temperature range and it is then determined that the NOx removal efficiency NR falls within the second abnormality region $Y_2$ when the temperature TC of the NOx SCR catalyst 15 is brought into the second temperature range, it is determined that the NOx discharge amount exceeds the regulation value due to an irregularity in the amount or quality of aqueous urea solution that is supplied to the NOx SCR catalyst 15.

According to the invention, the irregularity confirmed region $X_1$ is set to a region, within which the NOx removal efficiency NR falls when the NOx discharge amount exceeds the regulation value due to an irregularity in the amount or quality of aqueous urea solution that is supplied to the NOx SCR catalyst 15, within which the NOx removal efficiency NR does not fall when the NOx discharge amount exceeds the regulation value due to deterioration of the NOx SCR catalyst 15, and in which the catalyst temperature TC of the NOx SCR catalyst 15 is within the predetermined first temperature range. If it is determined that the NOx removal efficiency NR is within the irregularity confirmed region $X_1$ when the temperature TC of the NOx SCR catalyst 15 is within the first temperature range, it is determined that the NOx discharge amount exceeds the regulation value due to an irregularity in the amount or quality of aqueous urea solution that is supplied to the NOx SCR catalyst 15.

As can be seen from FIG. 3B, the irregularity confirmed region $X_1$ is a region that is adjacent to the determination-required region $X_2$. At any given catalyst temperature TC, the NOx removal efficiency NR is higher in the irregularity confirmed region $X_1$ than in the determination-required region $X_2$. Also, as can be seen from FIG. 3B, at any given catalyst temperature TC, the NOx removal efficiency NR is higher in the first abnormality region $Y_1$ than in the second abnormality region $Y_2$.

Next, the curves B1, B2 and C will be defined using generalized expressions, and the regions $X_1$, $X_2$, $Y_1$ and $Y_2$ will be defined by the curves $B_1$, $B_2$ and C that are defined using the generalized expressions.

That is, as can be seen from FIG. 3B, when the NOx discharge amount reaches the regulation value due to deterioration of the NOx SCR catalyst 15, the NOx removal efficiency NR increases toward the standard NOx removal efficiency A as the temperature TC of the NOx SCR catalyst 15 increases after activation of the NOx SCR catalyst 15, as indicated by the curve B1. In contrast, when the NOx discharge amount reaches the regulation value due to an irregularity in the amount or quality of aqueous urea solution that is supplied to the NOx SCR catalyst 15, the NOx removal efficiency NR decreases at a constant rate with respect to the standard NOx removal efficiency A independently of the temperature TC of the NOx SCR catalyst 15, as indicated by the curve C.

In this case, as shown in FIG. 3B, the NOx removal efficiency NR when the NOx discharge amount reaches the regulation value due to deterioration of the NOx SCR catalyst 15 matches the NOx removal efficiency NR when the NOx discharge amount reaches the regulation value due to an irregularity in the amount or quality of aqueous urea solution that is supplied to the NOx SCR catalyst 15, at a specific temperature TCa of the NOx SCR catalyst 15 after activation of the NOx SCR catalyst 15.

The above-described first temperature range is set to a range between the activation temperature $TC_0$ of the NOx SCR catalyst 15 and the specific temperature TCa of the NOx SCR catalyst 15.

Also, as can be seen from FIG. 3B, at any given catalyst temperature TC within the first temperature range, the NOx removal efficiency NR when the NOx discharge amount reaches the regulation value due to deterioration of the NOx SCR catalyst 15 (indicated by the curve B1) is lower than the NOx removal efficiency NR when the NOx discharge amount reaches the regulation value due to an irregularity in the amount or quality of aqueous urea solution that is supplied to the NOx SCR catalyst 15 (indicated by the curve C). The determination-required region $X_2$ is set to a region which is within the first temperature range, and in which the NOx removal efficiency NR is lower, at any given catalyst temperature TC, than the NOx removal efficiency NR when the NOx discharge amount reaches the regulation value due to deterioration of the NOx SCR catalyst 15 (indicated by the curve B1).

Also, as indicated by the curve B2 in FIG. 3B, even when the catalysis of the NOx SCR catalyst 15 is completely lost, the NOx removal efficiency NR increases as the temperature TC of the NOx SCR catalyst 15 increases. The NOx removal efficiency NR when the catalysis of the NOx SCR catalyst 15 is completely lost matches the NOx removal efficiency NR when the NOx discharge amount reaches the regulation value due to an irregularity in the amount or quality of aqueous urea solution that is supplied to the NOx SCR catalyst 15 (indicated by the curve C), at a certain temperature $TC_2$ of the NOx SCR catalyst 15 that is higher than the specific temperature TCa of the NOx SCR catalyst 15.

The second temperature range is set within a temperature region having the lower limit that is higher than the certain temperature $TC_2$ of the NOx SCR catalyst 15. In the concrete example shown in FIG. 3B, the lower limit of the second temperature range matches the certain catalyst temperature $TC_2$.

As can be seen from FIG. 3B, within the second temperature range, the first abnormality region $Y_1$ is set to a region between the curve B1 that indicates the NOx removal efficiency NR when the NOx discharge amount reaches the regulation value due to deterioration of the NOx SCR catalyst 15 and the curve B2 that indicates the NOx removal efficiency NR when the catalysis of the NOx SCR catalyst 15 is completely lost. Within the second temperature range, the second abnormality region $Y_2$ is set to a region in which the NOx removal efficiency NR is lower, at any given catalyst temperature TC, than the NOx removal efficiency NR when the NOx discharge amount reaches the regulation value due to an irregularity in the amount or quality of aqueous urea solution that is supplied to the NOx SCR catalyst 15 (indicated by the curve C).

An abnormality determination in the second temperature range is performed after the catalyst temperature TC is brought into the second temperature range due to a change in the operating state. However, the catalyst temperature TC sometimes does not increase to a value within the second temperature range. In this case, an abnormality determination in the second temperature range cannot be performed.

Therefore, according to the embodiment of the invention, if it is determined that the NOx removal efficiency NR is within the determination-required region $X_2$ when the temperature TC of the NOx SCR catalyst 15 is within the first temperature range, and the temperature TC of the NOx SCR catalyst 15 is not brought into the second temperature range within a prescribed period, the NOx SCR catalyst 15 is heated until the temperature TC of the NOx SCR catalyst 15 is brought into the second temperature range.

In the embodiment of the invention, it is necessary to detect the NOx removal efficiency NR achieved by the NOx SCR catalyst 15. Therefore, the amount of NOx that is discharged from the engine per unit time (hereinafter, referred to as "NOx amount NOXA) is stored in advance in the ROM 32 in the form of a map indicating a function of a required torque TQ and an engine speed N. The amount of NOx discharged from the NOx SCR catalyst 15 per unit time is determined based on the NOx concentration detected by the NOx sensor 29 and the exhaust gas amount, that is, the intake air amount. Accordingly, the NOx removal efficiency NR is determined based on the NOx amount NOXA shown in FIG. 4 and the value detected by the NOx sensor 29.

Figure 5:
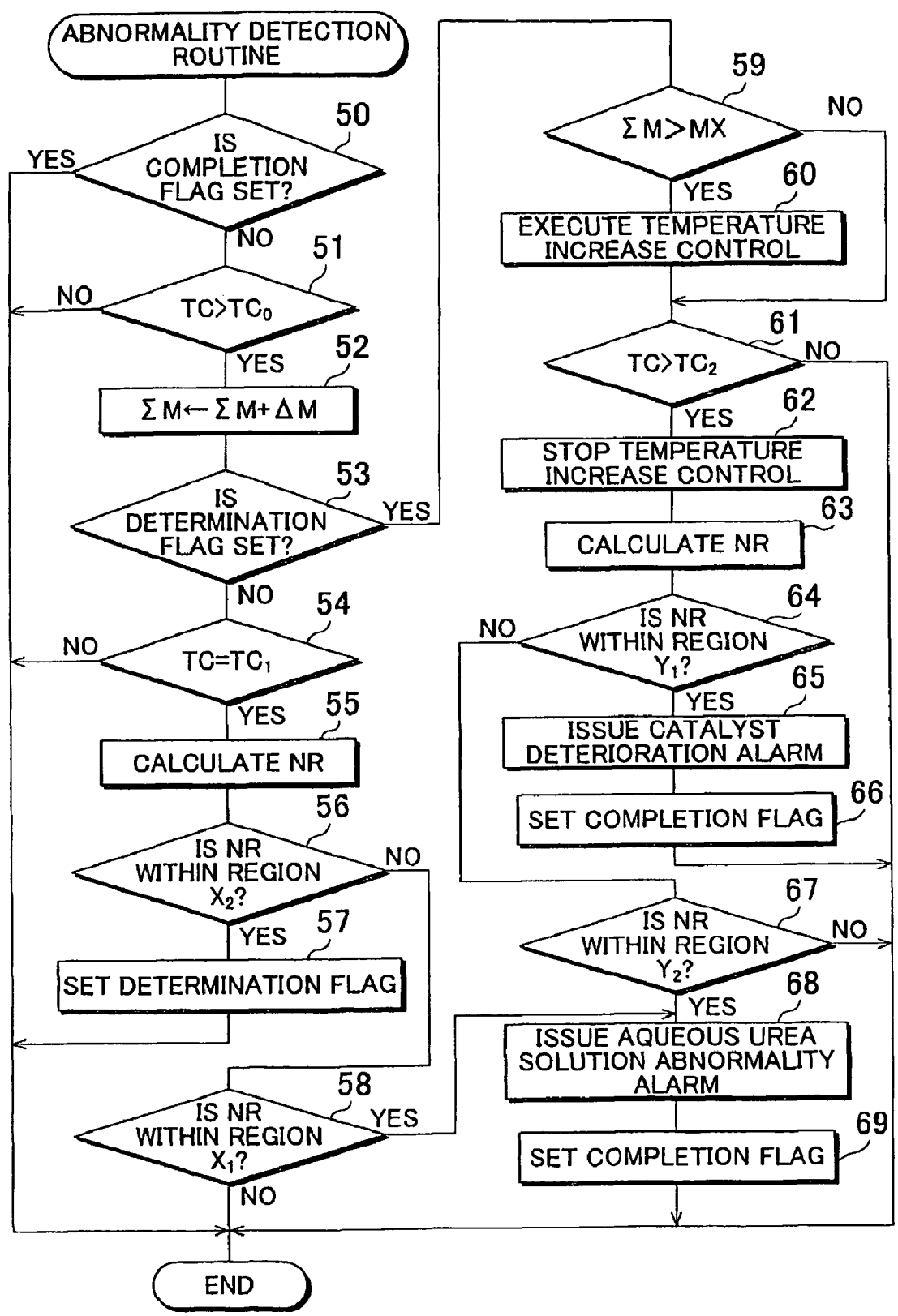
FIG. 5 is a flowchart showing an abnormality detection routine.

Next, an abnormality detection routine will be described with reference to FIG. 5. This routine is executed in an interruption manner at predetermined time intervals. As shown in FIG. 5, it is first determined in step 50 whether a completion flag, which indicates that an abnormality detection that is performed every time the vehicle is driven is completed, is set. When it is determined that the completion flag is set, the routine ends. On the other hand, when it is determined that the completion flag is not set, step 51 is executed. In step 51, it is determined whether the catalyst temperature TC exceeds the activation temperature $TC_0$. If it is determined that the catalyst temperature TC exceeds the activation temperature $TC_0$, step 52 is executed to start abnormality detection.

In step 52, a predetermined time $\Delta M$ is added to $\Sigma M$. Therefore, $\Sigma M$ indicates the time that has elapsed after the catalyst temperature TC exceeds the activation temperature $TC_0$. In this case, instead of the predetermined time, an intake air amount, a fuel injection amount or a vehicle speed may be used as $\Delta M$. In step 53, it is determined whether a determination flag is set. When step 53 is executed for the first time, the determination flag is not set. Accordingly, step 54 is executed.

In step 54, it is determined whether the catalyst temperature TC becomes equal to a predetermined temperature $TC_1$ within the first temperature range shown in FIG. 3B. When the catalyst temperature TC matches the predetermined temperature $TC_1$, step 55 is executed. In step 55, the NOx removal efficiency NR is calculated based on the map shown in FIG. 4 and a signal output from the NOx sensor 29. Next, it is determined in step 56 whether the NOx removal efficiency NR is within the determination-required region $X_2$. When it is determined that the NOx removal efficiency NR is not within the determination-required region $X_2$, step 58 is executed. In step 58, it is determined whether the NOx removal efficiency NR is within the irregularity confirmed region $X_1$. When it is determined that the NOx removal efficiency NR is not within the irregularity confirmed region $X_1$, the routine ends.

On the other hand, when it is determined in step 56 that the NOx removal efficiency NR is within the determination-required region $X_2$, step 57 is executed. In step 57, the determination flag is set. After the determination flag is set, in the subsequent routine, step 59 is executed after step 53. In step 59, it is determined whether the elapsed time $\Sigma M$ exceeds the predetermined time MX. When it is determined that the elapsed time $\Sigma M$ is equal to or shorter than the predetermined time MX, step 61 is executed without executing step 60. In step 61, it is determined whether the catalyst temperature TC exceeds the predetermined temperature $TC_2$ shown in FIG. 3B. When it is determined that the catalyst temperature TC exceeds the predetermined temperature $TC_2$, step 62 is executed to perform an abnormality determination.

On the other hand, when the catalyst temperature TC is not increased to the predetermined temperature $TC_2$ and it is determined in step 59 that the elapsed time $\Sigma M$ is longer than the predetermined time MX, step 60 is executed. In step 60, control for increasing the temperature of the NOx SCR catalyst 15 is executed. The temperature of the NOx SCR catalyst 15 is increased, for example, by retarding the fuel injection timing to increase the temperature of the exhaust gas or by supplying additional fuel toward a portion upstream of the oxidation catalyst 12. After the control for increasing the temperature is started, if it is determined in step 61 that the catalyst temperature TC is higher than the predetermined catalyst temperature $TC_2$, step 62 is executed. In step 62, the control for increasing the temperature of the NOx SCR catalyst 15 is stopped. As a matter of course, when the catalyst temperature TC becomes higher than the predetermined catalyst temperature $TC_2$ without executing the control for increasing the temperature of the NOx SCR catalyst 15, no control is executed in step 62.

Figure 4:
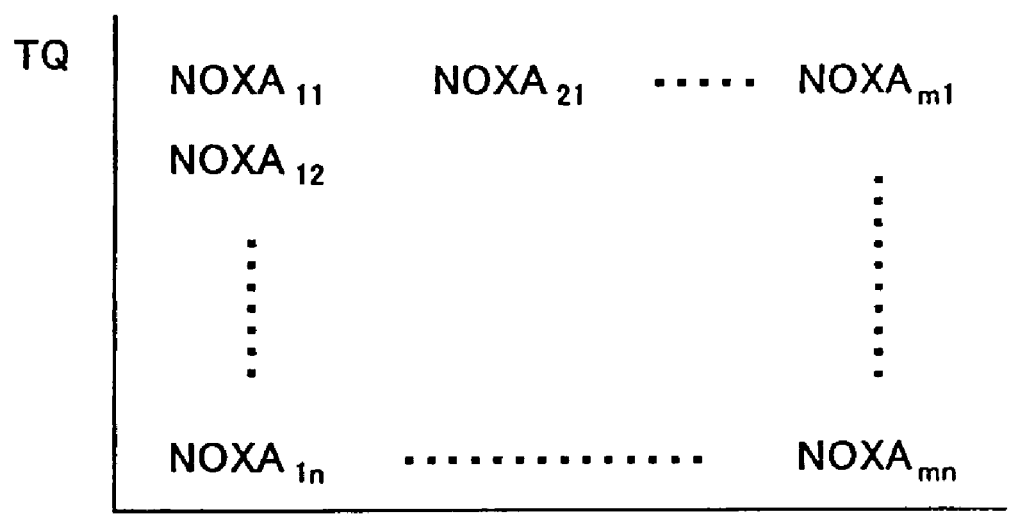
FIG. 4 is a graph showing a map of an amount NOXA of NOx discharged from the engine.

Next, in step 63, the NOx removal efficiency NR is calculated based on the map shown in FIG. 4 and a signal output from the NOx sensor 29. Next, it is determined in step 64 whether the NOx removal efficiency NR is within the first abnormality region $Y_1$. When the NOx removal efficiency NR is not within the first abnormality region $Y_1$, step 67 is executed without executing steps 65 and 66. In step 67, it is determined whether the NOx removal efficiency NR is within the second abnormality region $Y_2$. When it is determined that the NOx removal efficiency NR is not within the second abnormality region $Y_2$, the routine ends.

On the other hand, when it is determined in step 64 that the NOx removal efficiency NR is within the first abnormality region $Y_1$, step 65 is executed. In step 65, an alarm that indicates the fact that the NOx discharge amount exceeds the regulation value due to deterioration of the NOx SCR catalyst 15 is issued. In step 66, the completion flag is set.

On the other hand, when it is determined in step 67 that the NOx removal efficiency NR is within the second abnormality region $Y_2$, step 68 is executed. Also, when it is determined in step 58 that the NOx removal efficiency NR is within the abnormality determination-required region $X_1$, step 68 is executed. In step 68, an alarm that indicates the fact that the NOx discharge amount exceeds the regulation value due to an irregularity in the amount or quality of aqueous urea solution that is supplied to the NOx SCR catalyst 15 is issued. Next, in step 69, the completion flag is set.

The invention claimed is:

1. An abnormality detection system for an internal combustion engine that determines whether a NOx discharge amount exceeds a prescribed regulation value due to deterioration of a NOx selective catalytic reduction catalyst arranged in an exhaust passage of the internal combustion engine or due to an irregularity in an amount or quality of aqueous urea solution that is supplied to the NOx selective catalytic reduction catalyst, comprising:

An Electronic Control Unit (ECU) having:
 a determination-required region setting unit that sets a determination-required region to a region within which a NOx removal efficiency falls in either a case where the NOx discharge amount exceeds the regulation value due to deterioration of the NOx selective catalytic reduction catalyst or a case where the NOx discharge amount exceeds the regulation value due to an irregularity in the amount or quality of aqueous urea solution that is supplied to the NOx selective catalytic reduction catalyst, and in which a temperature of the NOx selective catalytic reduction catalyst is within a predetermined first temperature range;
 a first abnormality region setting unit that sets a first abnormality region to a region within which the NOx removal efficiency falls when the NOx discharge amount exceeds the regulation value due to deterioration of the NOx selective catalytic reduction catalyst, within which the NOx removal efficiency does not fall when the NOx discharge amount exceeds the regulation value due to an irregularity in the amount or quality of aqueous urea solution that is supplied to the NOx selective catalytic reduction catalyst, and in which the temperature of the NOx selective catalytic reduction catalyst is within a predetermined second temperature range having a lower limit that is higher than an upper limit of the first temperature range;
 a second abnormality region setting unit that sets a second abnormality region to a region within which the NOx removal efficiency falls when the NOx discharge amount exceeds the regulation value due to an irregularity in the amount or quality of aqueous urea solution that is supplied to the NOx selective catalytic reduction catalyst, within which the NOx removal efficiency does not fall when the NOx discharge amount exceeds the prescribed regulation value due to deterioration of the NOx selective catalytic reduction catalyst, and in which the temperature of the NOx selective catalytic reduction catalyst is within the second temperature range; and an abnormality factor determination unit that determines that the NOx discharge amount exceeds the regulation value due to deterioration of the NOx selective catalytic reduction catalyst, if it is determined that the NOx removal efficiency is within the determination-required region when the temperature of the NOx selective catalytic reduction catalyst is within the first temperature range and it is then determined that the NOx removal efficiency falls within the first abnormality region when the temperature of the NOx selective catalytic reduction catalyst is brought into the second temperature range, the abnormality factor determination unit determining that the NOx discharge amount exceeds the regulation value due to an irregularity in the amount or quality of aqueous urea solution that is supplied to the NOx selective catalytic reduction catalyst, if it is determined that the NOx removal efficiency is within the determination-required region when the temperature of the NOx selective catalytic reduction catalyst is within the first temperature range and it is then determined that the NOx removal efficiency falls within the second abnormality region when the temperature of the NOx selective catalytic reduction catalyst is brought into the second temperature range.

2. The abnormality detection system according to claim 1, further comprising:

an irregularity-confirmed region setting unit that sets an irregularity-confirmed region to a region within which the NOx removal efficiency falls when the NOx discharge amount exceeds the regulation value due to an irregularity in the amount or quality of aqueous urea solution that is supplied to the NOx selective catalytic reduction catalyst, within which the NOx removal efficiency does not fall when the NOx discharge amount exceeds the regulation value due to deterioration of the NOx selective catalytic reduction catalyst, and in which the temperature of the NOx selective catalytic reduction catalyst is within the first temperature range, wherein if it is determined that the NOx removal efficiency is within the irregularity-confirmed region when the temperature of the NOx selective catalytic reduction catalyst is within the first temperature range, the abnormality factor determination unit determines that the NOx discharge amount exceeds the regulation value due to an irregularity in the amount or quality of aqueous urea solution that is supplied to the NOx selective catalytic reduction catalyst.

3. The abnormality detection system according to claim 2, wherein the irregularity-confirmed region setting unit sets the irregularity-confirmed region to a region which is adjacent to the determination-required region, and in which the NOx removal efficiency is higher than the NOx removal efficiency in the determination-required region at any given catalyst temperature.

4. The abnormality detection system according to claim 1, wherein the first abnormality region setting unit sets the first abnormality region to a region in which the NOx removal efficiency is higher than the NOx removal efficiency in the second abnormality region at any given catalyst temperature.

5. The abnormality detection system according to claim 1, wherein:

when the NOx discharge amount reaches the regulation value due to deterioration of the NOx selective catalytic reduction catalyst, as the temperature of the NOx selective catalytic reduction catalyst increases after activation of the NOx selective catalytic reduction catalyst, the NOx removal efficiency increases due to an increase in a ratio of an amount of NOx that is reduced by reaction with ammonia in a gas phase to an entire amount of NOx that is reduced by reaction with ammonia;

when the NOx discharge amount reaches the regulation value due to an irregularity in the amount or quality of aqueous urea solution that is supplied to the NOx selective catalytic reduction catalyst, the NOx removal efficiency decreases at a constant rate after activation of the NOx selective catalytic reduction catalyst independently of the temperature of the NOx selective catalytic reduction catalyst;

the NOx removal efficiency when the NOx discharge amount reaches the regulation value due to deterioration of the NOx selective catalytic reduction catalyst matches the NOx removal efficiency when the NOx discharge amount reaches the regulation value due to an irregularity in the amount or quality of aqueous urea solution that is supplied to the NOx selective catalytic reduction catalyst, at a specific temperature of the NOx selective catalytic reduction catalyst after activation of the NOx selective catalytic reduction catalyst; and the first temperature range is set to a range between an activation temperature of the NOx selective catalytic reduction catalyst and the specific temperature of the NOx selective catalytic reduction catalyst.

6. The abnormality detection system according to claim 5, wherein:

at any given catalyst temperature within the first temperature range, the NOx removal efficiency when the NOx discharge amount reaches the regulation value due to deterioration of the NOx selective catalytic reduction catalyst is lower than the NOx removal efficiency when the NOx discharge amount reaches the regulation value due to an irregularity in the amount or quality of aqueous urea solution that is supplied to the NOx selective catalytic reduction catalyst; and the determination-required region setting unit sets the determination-required region to a region in which the NOx removal efficiency is lower, at any given catalyst temperature, than the NOx removal efficiency when the NOx discharge amount reaches the regulation value due to deterioration of the NOx selective catalytic reduction catalyst.

7. The abnormality detection system according to claim 6, wherein:

when catalysis of the NOx selective catalytic reduction catalyst is completely lost, as the temperature of the NOx selective catalytic reduction catalyst increases, the NOx removal efficiency increases due to the increase in the ratio of the amount of NOx that is reduced by the reaction with the ammonia in the gas phase to the entire amount of NOx that is reduced by the reaction with the ammonia;

the NOx removal efficiency when the catalysis of the NOx selective catalytic reduction catalyst is completely lost matches the NOx removal efficiency when the NOx discharge amount reaches the regulation value due to an irregularity in the amount or quality of aqueous urea solution that is supplied to the NOx selective catalytic reduction catalyst, at a certain temperature of the NOx selective catalytic reduction catalyst that is higher than the specific temperature of the NOx selective catalytic reduction catalyst; and the second temperature range is set within a temperature region that has a lower limit which is higher than the certain temperature of the NOx selective catalytic reduction catalyst.

8. The abnormality detection system according to claim 7, wherein:
the first abnormality region setting unit sets the first abnormality region to a region which is within the second temperature range and which is between the NOx removal efficiency when the NOx discharge amount reaches the regulation value due to deterioration of the NOx selective catalytic reduction catalyst and the NOx removal efficiency when the catalysis of the NOx selective catalytic reduction catalyst is completely lost; and
the second abnormality region setting unit sets the second abnormality region to a region which is within the second temperature range and in which the NOx removal efficiency is lower, at any given catalyst temperature, than the NOx removal efficiency when the NOx discharge amount reaches the regulation value due to an irregularity in the amount or quality of aqueous urea solution that is supplied to the NOx selective catalytic reduction catalyst.

9. The abnormality detection system according to claim 1, wherein if it is determined that the NOx removal efficiency is within the determination-required region when the temperature of the NOx selective catalytic reduction catalyst is within the first temperature range, and the temperature of the NOx selective catalytic reduction catalyst is not brought into the second temperature range within a prescribed period, the NOx selective catalytic reduction catalyst is heated until the temperature of the NOx selective catalytic reduction catalyst is brought into the second temperature range.

10. The abnormality detection system according to claim 1, further comprising:
a NOx sensor that is arranged in the exhaust passage of the internal combustion engine at a position downstream of the NOx selective catalytic reduction catalyst in order to obtain the NOx removal efficiency.

11. An abnormality detection method for an internal combustion engine, according to which it is determined whether a NOx discharge amount exceeds a prescribed regulation value due to deterioration of a NOx selective catalytic reduction catalyst arranged in an exhaust passage of the internal combustion engine or due to an irregularity in an amount or quality of aqueous urea solution that is supplied to the NOx selective catalytic reduction catalyst, comprising:
An Electronic Control Unit (ECU) which executes the following steps:
setting a determination-required region to a region within which a NOx removal efficiency falls in either a case where the NOx discharge amount exceeds the regulation value due to deterioration of the NOx selective catalytic reduction catalyst or a case where the NOx discharge amount exceeds the regulation value due to an irregularity in the amount or quality of aqueous urea solution that is supplied to the NOx selective catalytic reduction catalyst, and in which a temperature of the NOx selective catalytic reduction catalyst is within a predetermined first temperature range;
setting a first abnormality region to a region within which the NOx removal efficiency falls when the NOx discharge amount exceeds the regulation value due to deterioration of the NOx selective catalytic reduction catalyst, within which the NOx removal efficiency does not fall when the NOx discharge amount exceeds the regulation value due to an irregularity in the amount or quality of aqueous urea solution that is supplied to the NOx selective catalytic reduction catalyst, and in which the temperature of the NOx selective catalytic reduction catalyst is within a predetermined second temperature range having a lower limit that is higher than an upper limit of the first temperature range;
setting a second abnormality region to a region within which the NOx removal efficiency falls when the NOx discharge amount exceeds the regulation value due to an irregularity in the amount or quality of aqueous urea solution that is supplied to the NOx selective catalytic reduction catalyst, within which the NOx removal efficiency does not fall when the NOx discharge amount exceeds the prescribed regulation value due to deterioration of the NOx selective catalytic reduction catalyst, and in which the temperature of the NOx selective catalytic reduction catalyst is within the second temperature range;
determining that the NOx discharge amount exceeds the regulation value due to deterioration of the NOx selective catalytic reduction catalyst, if it is determined that the NOx removal efficiency is within the determination-required region when the temperature of the NOx selective catalytic reduction catalyst is within the first temperature range and it is then determined that the NOx removal efficiency falls within the first abnormality region when the temperature of the NOx selective catalytic reduction catalyst is brought into the second temperature range; and
determining that the NOx discharge amount exceeds the regulation value due to an irregularity in the amount or quality of aqueous urea solution that is supplied to the NOx selective catalytic reduction catalyst, if it is determined that the NOx removal efficiency is within the determination-required region when the temperature of the NOx selective catalytic reduction catalyst is within the first temperature range and it is then determined that the NOx removal efficiency falls within the second abnormality region when the temperature of the NOx selective catalytic reduction catalyst is brought into the second temperature range.

* * * * *